United States Patent
Mani et al.

(10) Patent No.: US 11,645,237 B2
(45) Date of Patent: May 9, 2023

(54) REPLICATING DATA UTILIZING A VIRTUAL FILE SYSTEM AND CLOUD STORAGE

(71) Applicant: International Business Machines Corporation, Armonk, NY (US)

(72) Inventors: Anbazhagan Mani, Bangalore (IN); Subramaniyan Nallasivam, Bangalore (IN); Ravindra Sure, Bangalore (IN); Rishika Kedia, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 15/976,745

(22) Filed: May 10, 2018

(65) Prior Publication Data
US 2019/0347338 A1    Nov. 14, 2019

(51) Int. Cl.
*G06F 16/13*  (2019.01)
*G06F 16/178*  (2019.01)
*G06F 16/188*  (2019.01)

(52) U.S. Cl.
CPC .......... *G06F 16/178* (2019.01); *G06F 16/134* (2019.01); *G06F 16/188* (2019.01)

(58) Field of Classification Search
CPC ..... G06F 16/178; G06F 16/134; G06F 16/188
USPC .......................................................... 707/626
See application file for complete search history.

(56) References Cited

U.S. PATENT DOCUMENTS

| 9,130,971 | B2 * | 9/2015 | Vasan | G06F 16/27 |
| 9,489,244 | B2 * | 11/2016 | Mitkar | G06F 9/45558 |
| 9,501,365 | B2 | 11/2016 | Parab | |
| 9,501,488 | B1 * | 11/2016 | Bent | G06F 16/1805 |
| 9,628,506 | B1 * | 4/2017 | Han | H04L 63/1483 |
| 9,639,383 | B1 * | 5/2017 | Natanzon | G06F 9/45558 |
| 9,727,470 | B1 * | 8/2017 | Cande | G06F 3/067 |
| 10,635,643 | B2 * | 4/2020 | Muthuswamy | G06F 16/13 |
| 11,023,433 | B1 * | 6/2021 | Datta | G06F 16/219 |
| 2003/0051021 | A1 * | 3/2003 | Hirschfeld | H04L 67/1027 709/223 |
| 2006/0047923 | A1 * | 3/2006 | Kodama | G06F 3/0685 711/161 |
| 2009/0043978 | A1 * | 2/2009 | Sawdon | G06F 3/065 711/162 |
| 2009/0112843 | A1 * | 4/2009 | Hsu | G06F 16/93 |
| 2010/0082899 | A1 * | 4/2010 | Nakajima | G06F 9/5077 711/114 |
| 2010/0199042 | A1 * | 8/2010 | Bates | H04L 9/0891 711/114 |

(Continued)

OTHER PUBLICATIONS

NIST, "NIST Cloud Computing Program," Information Technology Laboratory, retrieved from http://www.nist.gov/itl/cloud/, Nov. 2013, pp. 1-2.

(Continued)

*Primary Examiner* — Usmaan Saeed
*Assistant Examiner* — Jessica N Le
(74) *Attorney, Agent, or Firm* — Zilka-Kotab, P.C.

(57) ABSTRACT

A computer-implemented method according to one embodiment includes receiving, at a virtual file system, replicated data from a physical file system, transferring the replicated data from the virtual file system to cloud storage, and providing access to the replicated data in response to an unavailability of the physical file system, utilizing the virtual file system and the cloud storage.

20 Claims, 9 Drawing Sheets

(56) References Cited

U.S. PATENT DOCUMENTS

| | | | | |
|---|---|---|---|---|
| 2010/0306174 | A1* | 12/2010 | Otani | G06F 11/1464 707/640 |
| 2011/0066668 | A1* | 3/2011 | Guarraci | G06F 16/27 707/831 |
| 2012/0084261 | A1 | 4/2012 | Parab | |
| 2013/0042003 | A1* | 2/2013 | Franco | H04L 67/1097 709/226 |
| 2013/0117223 | A1* | 5/2013 | Niki | G06F 16/185 707/610 |
| 2013/0226971 | A1* | 8/2013 | Shoolman | G06F 16/2228 707/790 |
| 2013/0238575 | A1 | 9/2013 | Amarendran et al. | |
| 2013/0262390 | A1* | 10/2013 | Kumarasamy | H04L 41/0846 707/649 |
| 2013/0332700 | A1* | 12/2013 | Kopylovitz | G06F 3/0631 711/209 |
| 2014/0006349 | A1* | 1/2014 | Leroy | G06F 16/958 707/632 |
| 2014/0095451 | A1 | 4/2014 | Wang | |
| 2014/0143207 | A1* | 5/2014 | Brewer | G06F 11/1458 707/634 |
| 2014/0172792 | A1* | 6/2014 | Kabano | G06F 16/185 707/625 |
| 2014/0195484 | A1* | 7/2014 | Wang | G06F 9/45558 707/624 |
| 2014/0244937 | A1* | 8/2014 | Bloomstein | H04L 29/08801 709/212 |
| 2015/0113537 | A1* | 4/2015 | Bourbonnais | G06F 16/2365 718/103 |
| 2016/0142482 | A1* | 5/2016 | Mehta | H04L 67/1095 709/203 |
| 2016/0283493 | A1* | 9/2016 | Wideman | G06F 16/119 |
| 2016/0321311 | A1* | 11/2016 | Tallamraju | G06F 16/2443 |
| 2016/0373293 | A1* | 12/2016 | Kushmerick | H04L 67/10 |
| 2017/0024390 | A1* | 1/2017 | Vuppala | G06F 16/24578 |
| 2017/0123890 | A1* | 5/2017 | Haridas | G06F 11/0706 |
| 2017/0139831 | A1 | 5/2017 | Basham et al. | |
| 2018/0075231 | A1* | 3/2018 | Subramanian | G06F 16/86 |
| 2018/0084044 | A1* | 3/2018 | Nichols | G06F 16/16 |
| 2018/0109625 | A1* | 4/2018 | Jayaraman | H04L 67/10 |
| 2018/0150466 | A1* | 5/2018 | Paquet | G06F 16/9535 |
| 2018/0159939 | A1* | 6/2018 | Kumar | G06F 9/54 |
| 2018/0285379 | A1* | 10/2018 | Dain | H04L 69/04 |
| 2018/0329646 | A1* | 11/2018 | Dai | G06F 3/0604 |
| 2019/0146901 | A1* | 5/2019 | Hoover | G06F 16/338 714/38.1 |
| 2019/0163372 | A1* | 5/2019 | Sridharan | G06F 3/065 |
| 2019/0220367 | A1* | 7/2019 | Kashi Visvanathan | G06F 11/1448 |
| 2019/0227781 | A1* | 7/2019 | Ramasamy | H04L 41/0813 |

OTHER PUBLICATIONS

Mell et al., "The NIST Definition of Cloud Computing," Version 15, Oct. 2009, pp. 1-2.

Mell et al., "The NIST Definition of Cloud Computing," National Institute of Standards and Technology, Special Publication 800-145, Sep. 2011, pp. 1-7.

IBM Community, "Active File Management (AFM)," IBM Community, IBM Spectrum Scale Wikis, Sep. 30, 2015, 3 pages retrieved from https://www.ibm.com/developerworks/community/wikis/home?lang=en#!/wiki/General%20Parallel%20File%20System%20(GPFS)/page/Active%20File%20Management%20(AFM).

IBM Knowledge Center, "Scale Out Backup and Restore (SOBAR)," 2018, 4 pages retrieved from https://www.ibm.com/support/knowledgecenter/en/STXKQY_5.0.0/com.ibm.spectrum.scale.v5r00.doc/bl1adv_sobar.htm.

\* cited by examiner

US 11,645,237 B2

REPLICATING DATA UTILIZING A VIRTUAL FILE SYSTEM AND CLOUD STORAGE

BACKGROUND

The present invention relates to data storage management, and more specifically, this invention relates to replicating and storing data in order to provide access to the data during system unavailability.

Data migration, including the movement of predetermined data from a first storage location to a second storage location based on one or more criteria, is often used to obtain one or more benefits (e.g., cost, performance, etc.). However, it is desirable to maintain access to the data when the first storage location or the second storage location becomes unavailable after data migration has occurred.

SUMMARY

A computer-implemented method according to one embodiment includes receiving, at a virtual file system, replicated data from a physical file system, transferring the replicated data from the virtual file system to cloud storage, and providing access to the replicated data in response to an unavailability of the physical file system, utilizing the virtual file system and the cloud storage.

According to another embodiment, a computer program product for replicating data utilizing a virtual file system and cloud storage comprises a computer readable storage medium having program instructions embodied therewith, where the computer readable storage medium is not a transitory signal per se, and where the program instructions are executable by a processor to cause the processor to perform a method comprising receiving, at a virtual file system, replicated data from a physical file system, utilizing the processor, transferring the replicated data from the virtual file system to cloud storage, utilizing the processor, and providing, utilizing the processor, access to the replicated data in response to an unavailability of the physical file system, utilizing the virtual file system and the cloud storage.

A computer-implemented method according to another embodiment includes a processor, and logic integrated with the processor, executable by the processor, or integrated with and executable by the processor, where the logic is configured to receive, at a virtual file system, replicated data from a physical file system, transfer the replicated data from the virtual file system to cloud storage, and provide access to the replicated data in response to an unavailability of the physical file system, utilizing the virtual file system and the cloud storage.

Other aspects and embodiments of the present invention will become apparent from the following detailed description, which, when taken in conjunction with the drawings, illustrate by way of example the principles of the invention.

DETAILED DESCRIPTION

Figure 1:
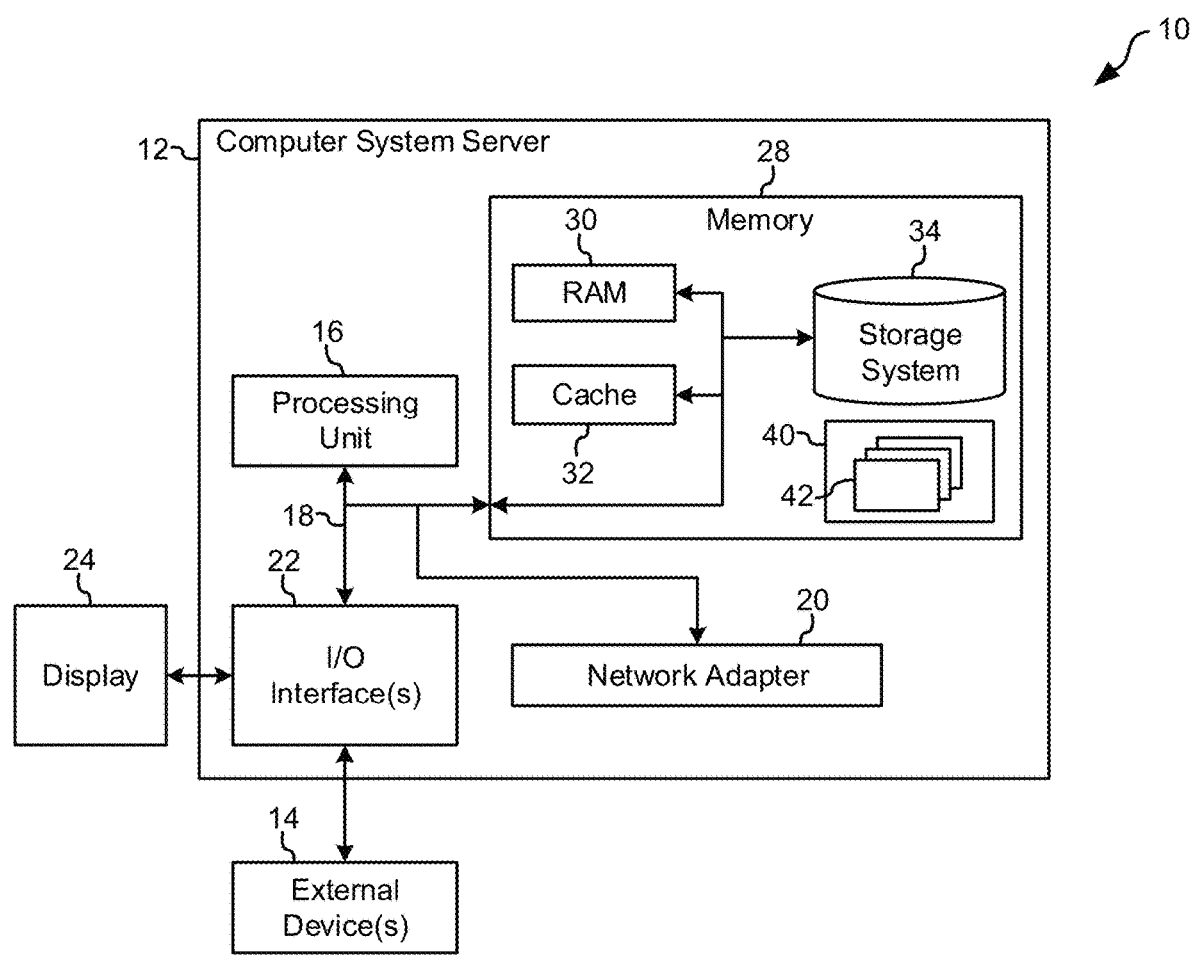
FIG. 1 depicts a cloud computing node according to an embodiment of the present invention.

The following description discloses several preferred embodiments of systems, methods and computer program products for replicating data utilizing a virtual file system and cloud storage. Various embodiments provide a method for replicating data from a physical file system to a virtual file system, and transferring the replicated data from the virtual file system to cloud storage.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for replicating data utilizing a virtual file system and cloud storage.

In one general embodiment, a computer-implemented method includes receiving, at a virtual file system, replicated data from a physical file system, transferring the replicated data from the virtual file system to cloud storage, and providing access to the replicated data in response to an unavailability of the physical file system, utilizing the virtual file system and the cloud storage.

In another general embodiment, a computer program product for replicating data utilizing a virtual file system and cloud storage comprises a computer readable storage medium having program instructions embodied therewith, where the computer readable storage medium is not a transitory signal per se, and where the program instructions are executable by a processor to cause the processor to perform a method comprising receiving, at a virtual file system, replicated data from a physical file system, utilizing the processor, transferring the replicated data from the virtual file system to cloud storage, utilizing the processor, and providing, utilizing the processor, access to the replicated data in response to an unavailability of the physical file system, utilizing the virtual file system and the cloud storage.

In another general embodiment, a computer-implemented method includes a processor, and logic integrated with the processor, executable by the processor, or integrated with and executable by the processor, where the logic is configured to receive, at a virtual file system, replicated data from a physical file system, transfer the replicated data from the virtual file system to cloud storage, and provide access to the replicated data in response to an unavailability of the physical file system, utilizing the virtual file system and the cloud storage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
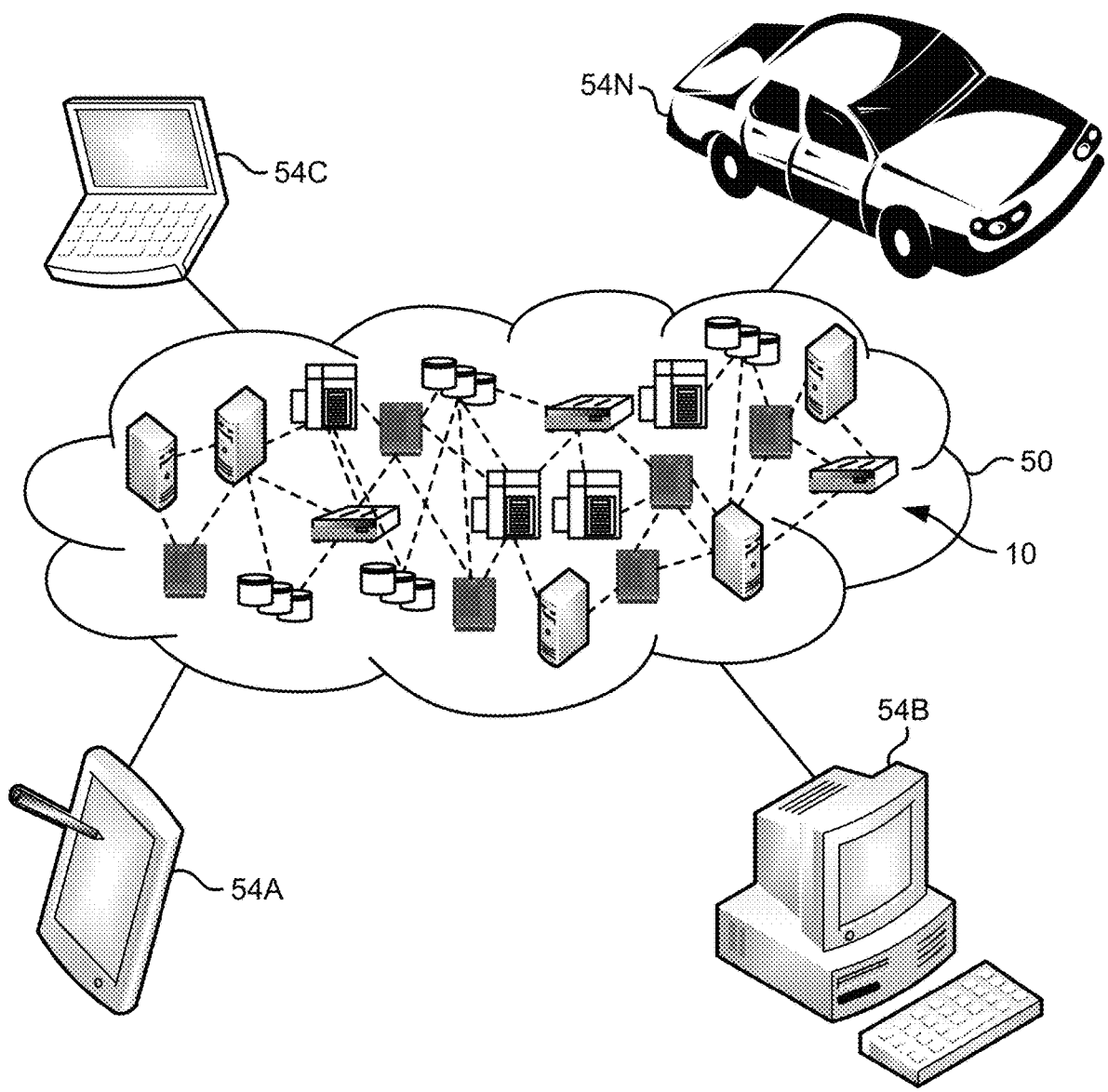
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
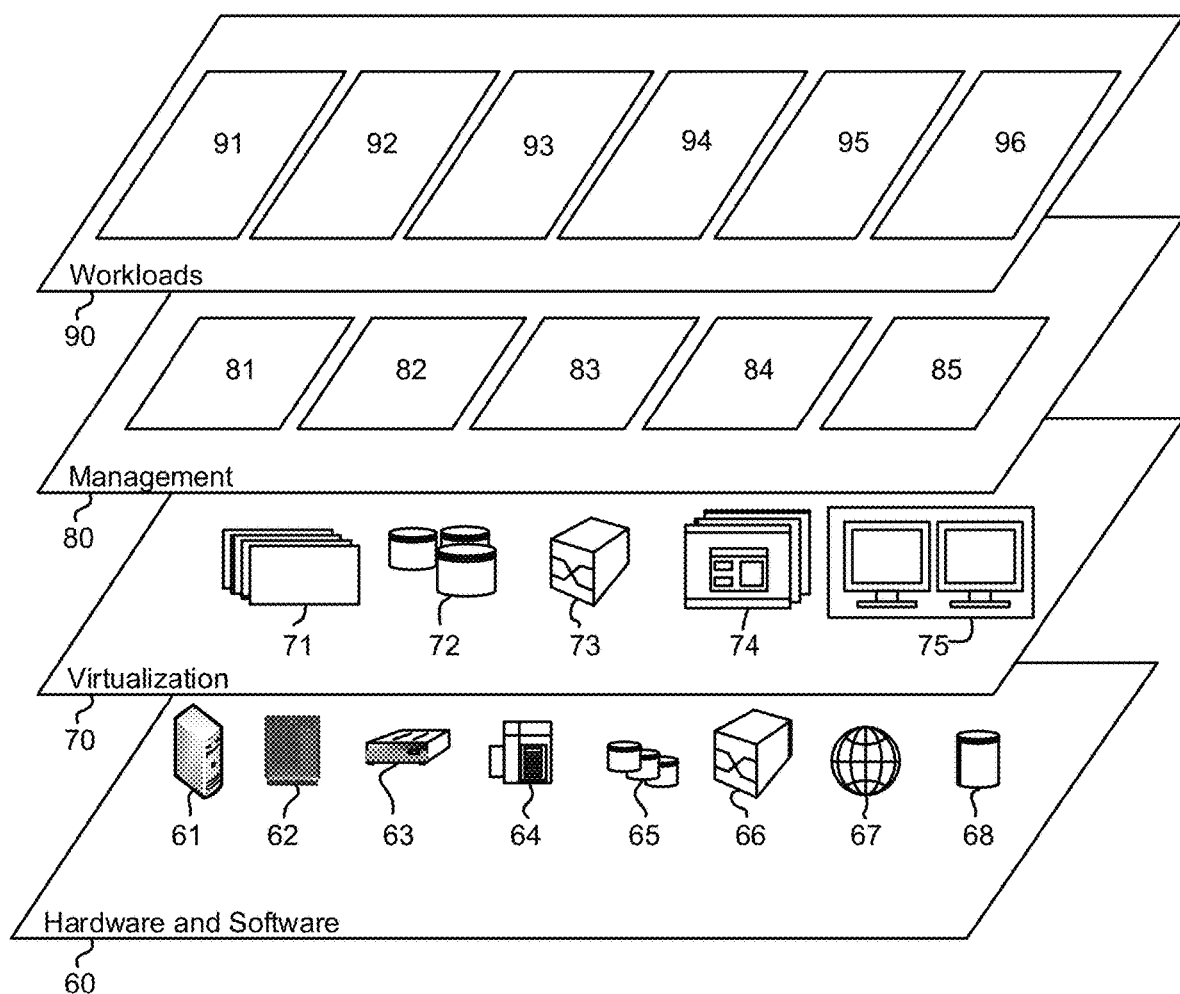
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
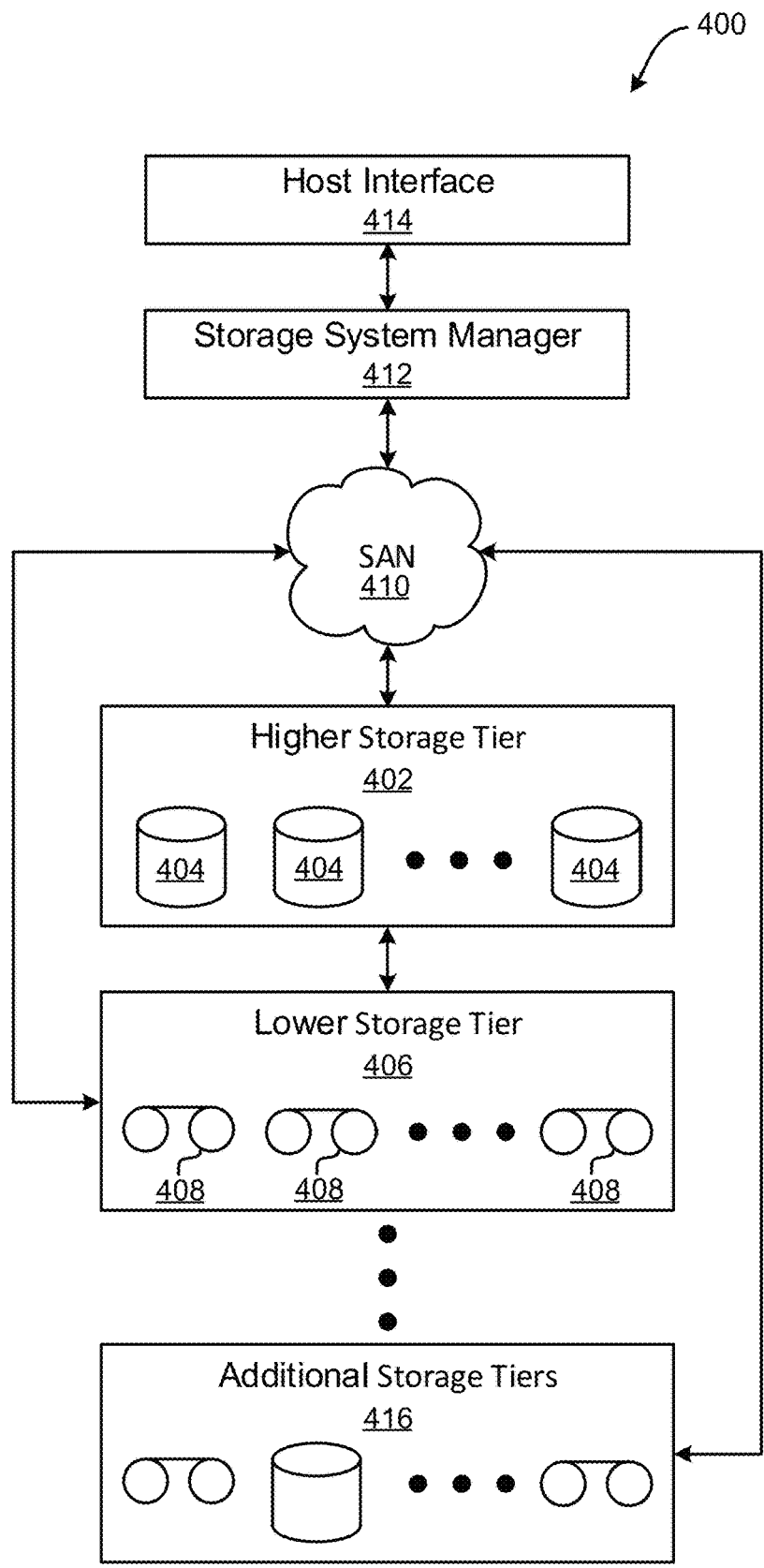
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
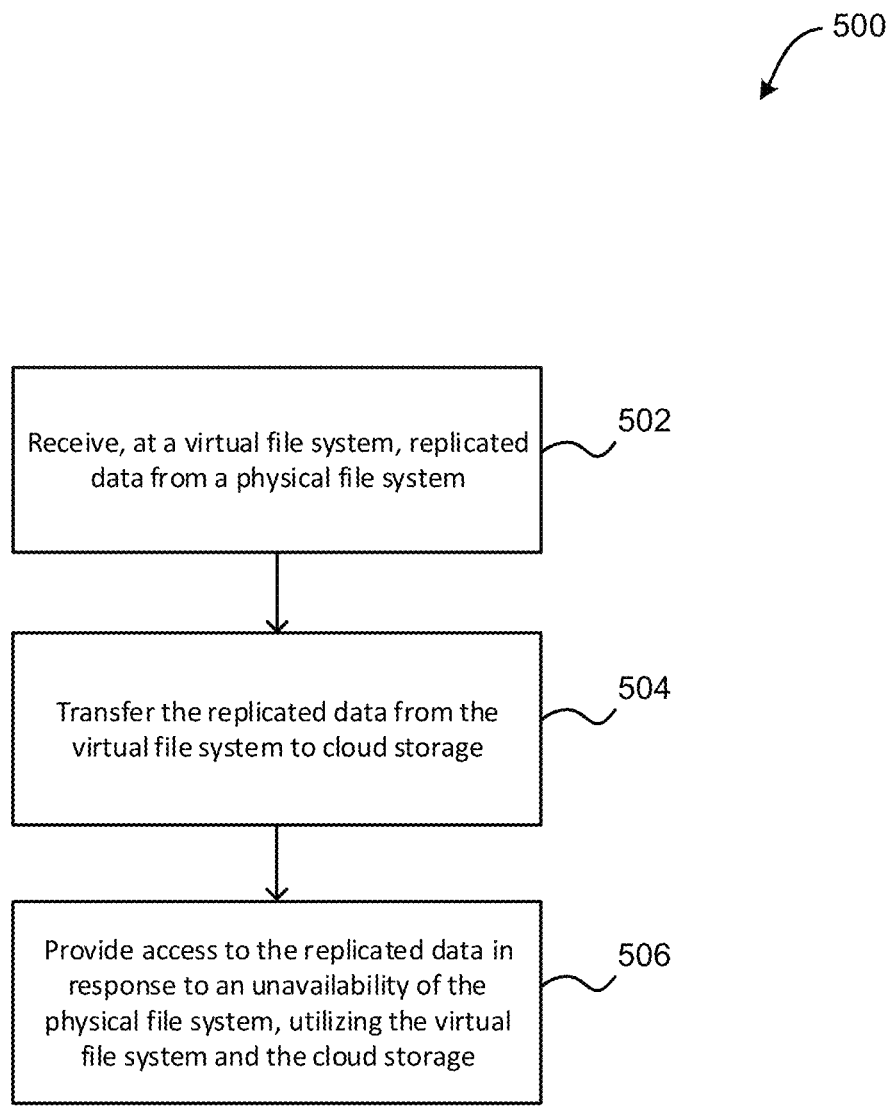
FIG. 5 illustrates a flowchart of a method for replicating data utilizing a virtual file system and cloud storage, in accordance with one embodiment.

Now referring to FIG. 5, a flowchart of a method 500 is shown according to one embodiment. The method 500 may be performed in accordance with the present invention in any of the environments depicted in FIGS. 1-4 and 8-9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where replicated data from a physical file system is received at a virtual file system. In one embodiment, the replicated data may include a replica of data stored at the physical file system. For example, the data may include one or more files, one or more objects, one or more applications, etc. In another embodiment, the physical file system may include a clustered file system. For example, the physical file system may include a shared file system that is simultaneously mounted on multiple servers.

Additionally, in one embodiment, the physical file system may be accessed by a plurality of different systems. For example, applications running on a plurality of different systems may retrieve, modify, and/or delete data stored within the physical file system. In another embodiment, the physical file system may be implemented utilizing physical hardware components. For example, the physical file system may reference hardware storage, hardware memory, hardware processing, etc.

Further, in one embodiment, the virtual file system may be implemented utilizing virtual hardware components. For example, the virtual file system may utilize virtual hardware storage, virtual hardware memory, virtual hardware processing, etc. In another example, the virtual file system may implement a layer of abstraction. In yet another example, the virtual file system may be implemented within a cloud computing environment.

Further still, in one embodiment, the replicated data may be sent from the physical file system to the virtual file system as part of a data backup operation. For example, data located at the physical file system may be replicated to create the replicated data, and the replicated data may be sent from the physical file system to the virtual file system. In another embodiment, the replicated data may be sent from the physical file system to the virtual file system as part of an active file management (AFM) operation.

Also, in one embodiment, the replicated data may be received asynchronously. For example, the data may be replicated and sent from the physical file system to the virtual file system in an asynchronous manner.

In addition, method 500 may proceed with operation 504, where the replicated data is transferred from the virtual file system to cloud storage. In one embodiment, the cloud storage may include data storage implemented within the cloud computing environment. For example, both the virtual file system and the cloud storage may be located within the cloud computing environment.

Furthermore, in one embodiment, the cloud storage may include cloud object storage. In another embodiment, a stub may be created at the virtual file system when the replicated data is transferred from the virtual file system to the cloud storage, where the stub represents the replicated data transferred to the cloud storage. For example, a stub associated with the replicated data may include an mode that identifies a storage location of the replicated data within the cloud storage.

Further still, in one embodiment, the replicated data may be removed from the virtual file system after transferring the replicated data to the cloud storage. In another embodiment, the replicated data may be maintained within the virtual file system after transferring the replicated data to the cloud storage. In yet another embodiment, the replicated data may be transferred from the virtual file system to the cloud storage utilizing transparent cloud tiering (TCT).

Also, in one embodiment, the replicated data may be transferred from the virtual file system to the cloud storage, based on a priority index score associated with the replicated data. For example, the priority index score may be calculated for data at the physical file system. In another example, the priority index score may be calculated based on a heat score of the data and/or a weight score of the data. For instance, the heat score and the weight score for the data may be combined to create the priority index score for the data.

Additionally, in one embodiment, a heat score of the data may include a value calculated based on an amount of time since the data was accessed. In another embodiment, a weight score of the data may include a value calculated based on a type of applications that access the data at the physical file system. For example, data that is accessed by one or more applications predetermined to have a high importance will have a higher weight score than data that is accessed by one or more applications predetermined to have a low importance.

Further, in one embodiment, the heat score may be calculated for the data at the physical file system before the replicated data is sent to the virtual file system. In another embodiment, the priority index score may be added to the data (e.g., as metadata, etc.). In yet another embodiment, when the data is replicated to create the replicated data, the replicated data may include the priority index score. In still another embodiment, the replicated data may be transferred from the virtual file system to the cloud storage if the priority index score associated with (e.g., included within, etc.) the replicated data exceeds a predetermined threshold score.

Further still, method 500 may proceed with operation 506, where in response to an unavailability of the physical file system, access to the replicated data is provided utilizing the virtual file system and the cloud storage. In one embodiment, the physical file system may become unavailable due to one or more occurrences (e.g., a natural disaster, physical damage to the hardware on which the physical file system is implemented, physical component failure, power loss, a corruption of data (e.g., due to malware, etc.), etc.).

Also, in one embodiment, the physical file system may be monitored, and the unavailability of the physical file system may be determined in response to the monitoring. In another embodiment, in response to the unavailability of the physical file system, requests sent from one or more user systems separate from the physical file system and the virtual file system may be redirected to the virtual file system. For example, an application running within a user system may first request the data from the physical file system. It may be determined that the physical file system is unavailable, and as a result, a request for the replicated data (e.g., a replicated version of the data stored at the physical file system, etc.) may be redirected to the virtual file system in response to determining that the physical file system is unavailable.

In addition, in one embodiment, in response to receiving the request for the replicated data, the virtual file system may perform a recall operation at the virtual file system. In another embodiment, the recall operation may be performed utilizing a stub located at the virtual file system. For example, the stub located at the virtual file system may include a location of the replicated data within the cloud storage. In another example, the stub may be used to identify a location of the replicated data within the cloud storage.

Furthermore, in one embodiment, the virtual file system may request the replicated data from the cloud storage, utilizing the identified location of the replicated data within the cloud storage. In another embodiment, the cloud storage may return the replicated data directly to the user system requesting the replicated data from the virtual file system. For example, the cloud storage may return the replicated data directly to an application requesting the replicated data from the virtual file system.

Further still, in one embodiment, when the physical file system is again available, data may be sent from the virtual file system and cloud storage to the physical file system. For example, the data sent may include data and metadata that have changed during the unavailability of the physical file system.

In this way, data recall may be performed transparently to the requesting user system, and data may be streamed directly from the cloud storage to the requesting user system. Additionally, since both the virtual file system and the cloud storage system are located in the cloud computing environment, communication latency between them may be minimized, and data replication retrieval may be expedited.

Figure 6:
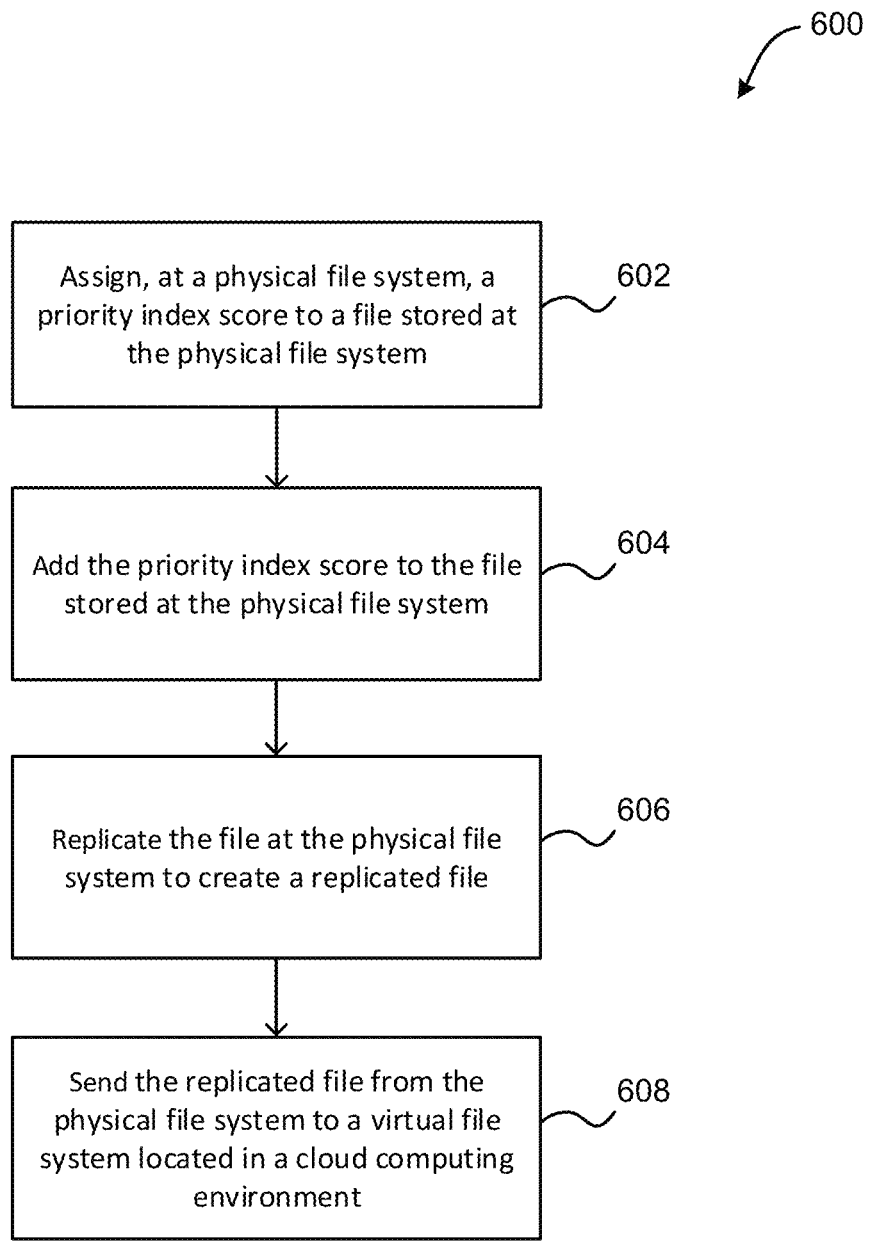
FIG. 6 illustrates a flowchart of a method for scoring and replicating data at a physical file system, in accordance with one embodiment.

Now referring to FIG. 6, a flowchart of a method 600 for scoring and replicating data at a physical file system is shown according to one embodiment. The method 600 may be performed in accordance with the present invention in any of the environments depicted in FIGS. 1-4 and 8-9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a priority index score is assigned, at a physical file system, to a file stored at the physical file system. In one embodiment, the priority index score may be determined based on a heat score of the data and/or a weight score of the data. Additionally, method 600 may proceed with operation 604, where the priority index score is added to the file stored at the physical file system. In one embodiment, the priority index score may be added as metadata to the file. In another embodiment, the priority index score may be appended to the file.

Further, method 600 may proceed with operation 606, where the file is replicated at the physical file system to create a replicated file. In one embodiment, the file may be replicated asynchronously. Further still, method 600 may proceed with operation 608, where the replicated file is sent from the physical file system to a virtual file system located in a cloud computing environment. In one embodiment, the replicated file may be sent asynchronously. In another embodiment, the replicated file may be sent from the physical file system to the virtual file system utilizing one or more active file management operations.

Figure 7:
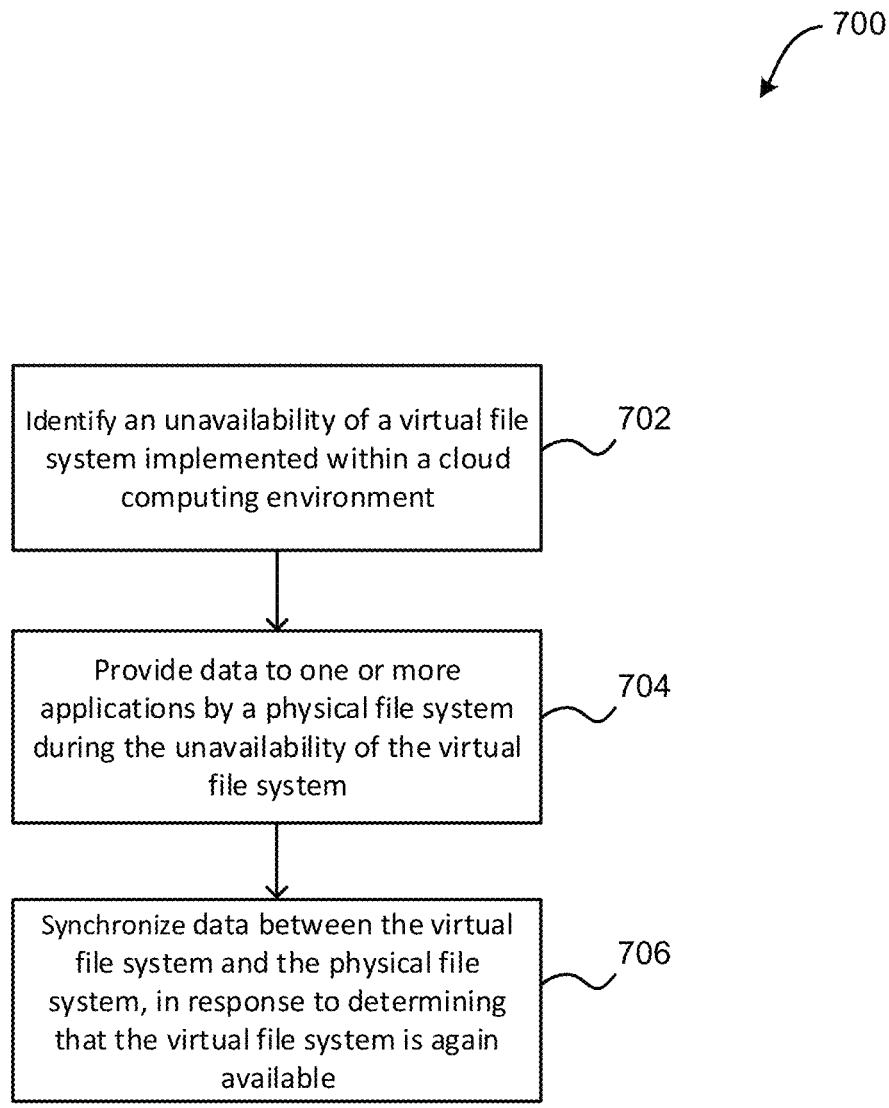
FIG. 7 illustrates a flowchart of a method for recovering after an unavailability of a virtual file system, in accordance with one embodiment.

Now referring to FIG. 7, a flowchart of a method 700 for recovering after an unavailability of a virtual file system is shown according to one embodiment. The method 700 may be performed in accordance with the present invention in any of the environments depicted in FIGS. 1-4 and 8-9, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where an unavailability of a virtual file system implemented within a cloud computing environment is identified. In one embodiment, the virtual file system may receive replicated data from a physical file system. In another embodiment, the virtual file system may be identified as unavailable in response to one or more occurrences (e.g., communication issues between the virtual file system and the physical file system, corruption of data within the virtual file system, etc. In yet another embodiment, the physical file system may be unable to contact/communicate with the virtual file system, the virtual file system may be offline, etc.

Additionally, method 700 may proceed with operation 704, where data is provided to one or more applications by a physical file system during the unavailability of the virtual file system. In one embodiment, physical file system may retrieve data stored within the physical file system, in response to requests for the data (e.g., from one or more applications running on one or more user systems, etc.).

Further, method 700 may proceed with operation 706, where data is synchronized between the virtual file system and the physical file system, in response to determining that the virtual file system is again available. In one embodiment, the physical file system may be able to communicate with the physical file system, the virtual file system may be online, etc. In another embodiment, the virtual file system may be determined to be available after the initial unavailability of the virtual file system.

Further still, in one embodiment, the synchronizing may include data synchronization between the physical file system and the virtual file system. For example, data at the physical file system may be replicated and stored at the virtual file system. In another embodiment, the synchronizing may include the asynchronous replication of data from the physical file system to the virtual file system. In yet another embodiment, the synchronizing may include determining data that has changed within the physical file system since a last successful synchronization between the physical file system and the virtual file system, replicating the changed data at the physical file system, and sending the replicated changed data to the virtual file system.

In this way, a performance of the physical file system may be unaffected during an unavailability of the virtual file system.

Figure 8:
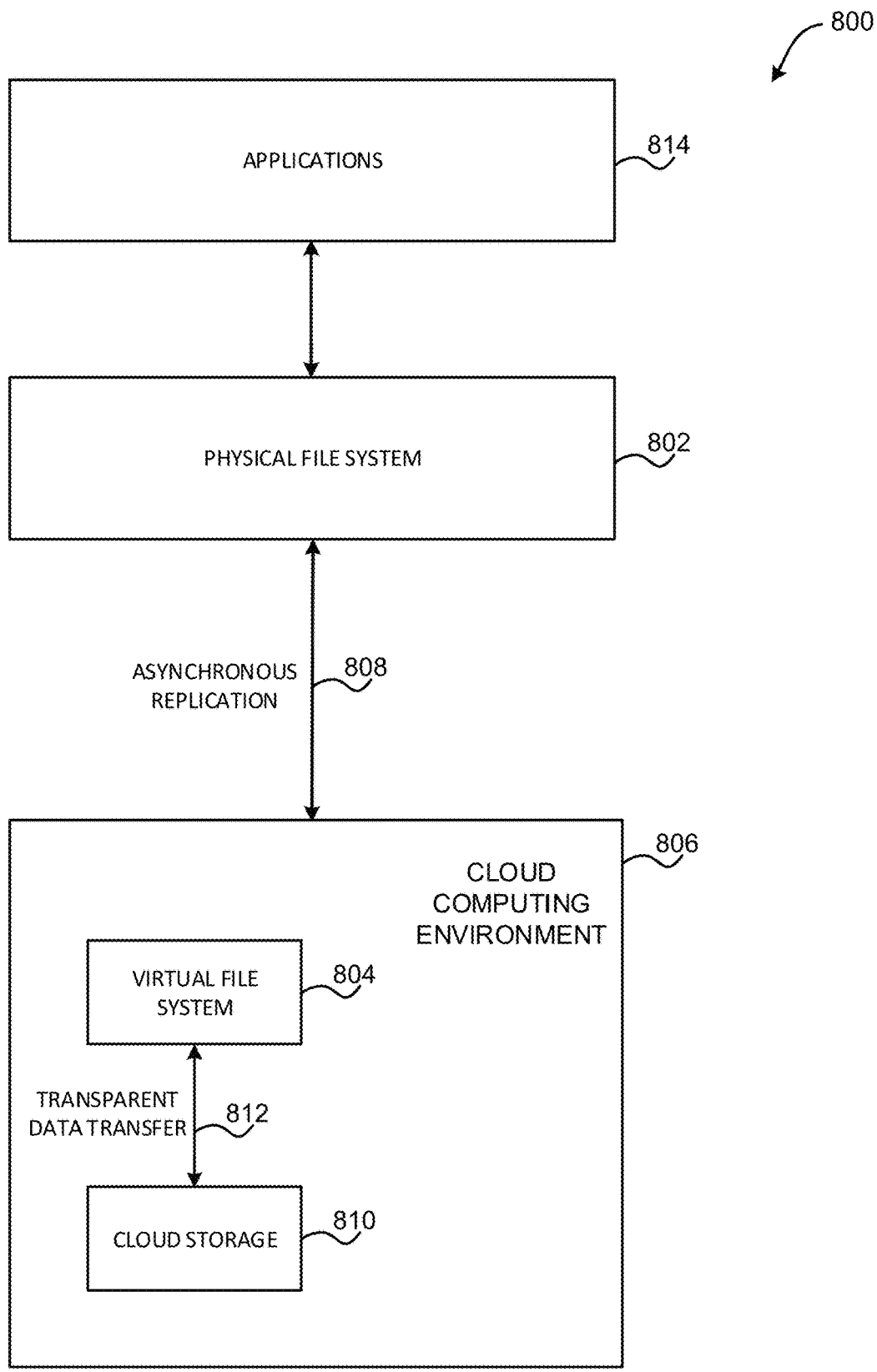
FIG. 8 illustrates an exemplary data replication environment, in accordance with one embodiment.

FIG. 8 illustrates an exemplary data replication environment 800, according to one embodiment. As shown, a physical file system 802 may calculate a priority index score for the data stored at the physical file system 802, and may add the priority index score to the data stored at the physical file system. Additionally, the physical file system 802 may then perform asynchronous data replication 808 with a virtual file system 804 located within a cloud computing environment 806.

For example, data stored at the physical file system 802 may be replicated to create replicated data (e.g., a replicated copy of the data, etc.), and such replicated data may be sent from the physical file system 802 to the virtual file system 804, using asynchronous data replication 808. In one embodiment, the replicated data may include the priority index score for the data.

Further, in one embodiment, in response to receiving the replicated data at the virtual file system 804, the virtual file system 804 may send the replicated data to cloud storage 810, utilizing a transparent data transfer 812. In another embodiment, the replicated data may be sent to the cloud storage 810 if the priority index score associated with the replicated data exceeds a predetermined threshold score. In yet another embodiment, one or more stubs may be created at the virtual file system 804 that indicate a location of the replicated data within the cloud storage 810.

Further still, in one embodiment, if the cloud computing environment 806 becomes unavailable, the physical file system 802 may operate normally. For example, the physical file system 802 may receive requests for data from one or more applications 814 separate from the physical file system 802, and may provide data to the one or more applications 814 from the physical file system itself. In another embodiment, when the cloud computing environment 806 again become available, the physical file system 802 may again perform asynchronous data replication 808 with a virtual file system 804 located within a cloud computing environment 806. In this way, all data may remain synchronized between the physical file system 802 and the virtual file system 804.

Also, in one embodiment, if the physical file system 802 becomes unavailable, then requests for data from the one or more applications 814 may be transparently redirected to the virtual file system 804. When the virtual file system 804 receives the request for data, it may determine whether it has a replicated copy of the requested data within the virtual file system 804 itself. If the virtual file system 804 has a replicated copy of the requested data, it may return the replicated copy of the data directly to the one or more applications 814.

In addition, in one embodiment, If the virtual file system 804 only has a stub for the replicated copy of the requested data (and not the replicated data itself), it may reference the stub in order to identify a location of the replicated data within the cloud storage 810. It may then send a request for the replicated data to the cloud storage 810, along with the location of the replicated data within the cloud storage 810, and an identifier of the one or more requesting applications 814.

Furthermore, in one embodiment, upon receiving the request for the replicated data, the cloud storage 810 may retrieve the data at the identified location, and may provide the replicated data directly to the one or more requesting applications 814, utilizing the identifier of the one or more requesting applications 814. In this way, the virtual file system 804 and the cloud storage 810 may work together to transparently provide replicated copies of requested data to one or more applications 814 when the physical file system 802 is unavailable.

Disaster Recovery Using Active File Management and Transparent Cloud Tiering on the Cloud Infrastructure Active file management (AFM) may include a scalable, high-performance, file system caching layer integrated with a clustered file system. AFM may allow for the creation of associations from a local scale cluster to a remote cluster or storage, and the defining of the location and flow of file data to automate the management of the data. This may allow for the implementation of a single namespace view across sites around the world.

Transparent Cloud Tiering (TCT) may be included as a feature of the clustered file system that provides hybrid cloud storage capability. This software defined capability may enable usage of cloud object storage (public, private, on-premises, etc.) as a secure, reliable, transparent storage tier natively integrated within the clustered file system. It may leverage existing ILM policy language semantics available in the clustered file system, allowing administrators to define policies for tiering data to cloud object storage.

A migrated file may include a file that is migrated from the file system to the cloud object storage. Only the stub may be present on the file system as a result of the migrating. A pre-migrated file may include a file that is migrated from the file system to the cloud object storage and which is also available on the file system. A resident file may include a file that is stored and available on the file system. A recovery time objective (RTO) may include a duration of time and a service level within which the file system is to be restored after a disaster (or disruption) in order to avoid unacceptable consequences (to the applications) associated with a break in business continuity.

In one embodiment, cloud storage may be an inexpensive tier to implement, and moving inactive data to the cloud tier may result in a significant cost savings. Additionally, data storage of a local cluster may be reduced, which may improve a performance of the local cluster.

In another embodiment, after the cloud tiering migrates the files, only stubs (meta-data) may be present on the file system. When the stubs are accessed the file(s) may be transparently recalled from the cloud object storage. In this scenario, there is a need to provide a disaster recovery solution (e.g., when the primary data storage location goes down, it should be possible to fail over to a secondary data storage location and fail back to the primary data storage location when it comes back).

A method is proposed to use an underlying file system replication (e.g., AFM, etc.) to asynchronously replicate all the data on the primary file system to a secondary file system hosted on a cloud infrastructure using a WAN. The TCT service may be run on the secondary file system and the applicable files may be migrated on the cloud infrastructure to the cloud object storage by leveraging the internal network (which may not be charged by the cloud provider as it is on the cloud infrastructure's internal network). A Disaster Recovery (DR) Manager may co-ordinate the entire process and may optimize the DR based on cost and criticality of the access to the data.

In one embodiment, in a first step, each file or fileset (e.g., directory, etc.) may be assigned a DR_Priority_Index (Disaster Recovery Priority Index). It may be calculated using a unique formula:

DR_Priorty_Index=FileHeat*ApplicationWeight

The variable FileHeat may be calculated using the following:

Assuming fileHeatLossPercent=Y, fileHeatPeriodMinutes=X may mean that any file that has not been accessed for X minutes will lose Y % of its Heat. File Heat may include a number between 0 and 1.

ApplicationWeight may be defined as a number between 0 and 1 and may be set based on a nature of applications accessing the particular data. For example, A number greater than a first predetermined amount (e.g., 0.75, etc.) may mean that the file(s) are being accessed by mission/business critical applications and a number less than a second predetermined amount (e.g., 0.25, etc.) may mean that the files are accessed by non-critical applications.

In one embodiment, the DR_Priority_Index may be computed for all the files and directories, and filesystem may be enhanced to keep it continuously updated.

In another embodiment, in a second step, an asynchronous file system replication may be enabled between a primary and a secondary infrastructure hosted on the cloud infrastructure, which may also co-host object storage.

Figure 9:
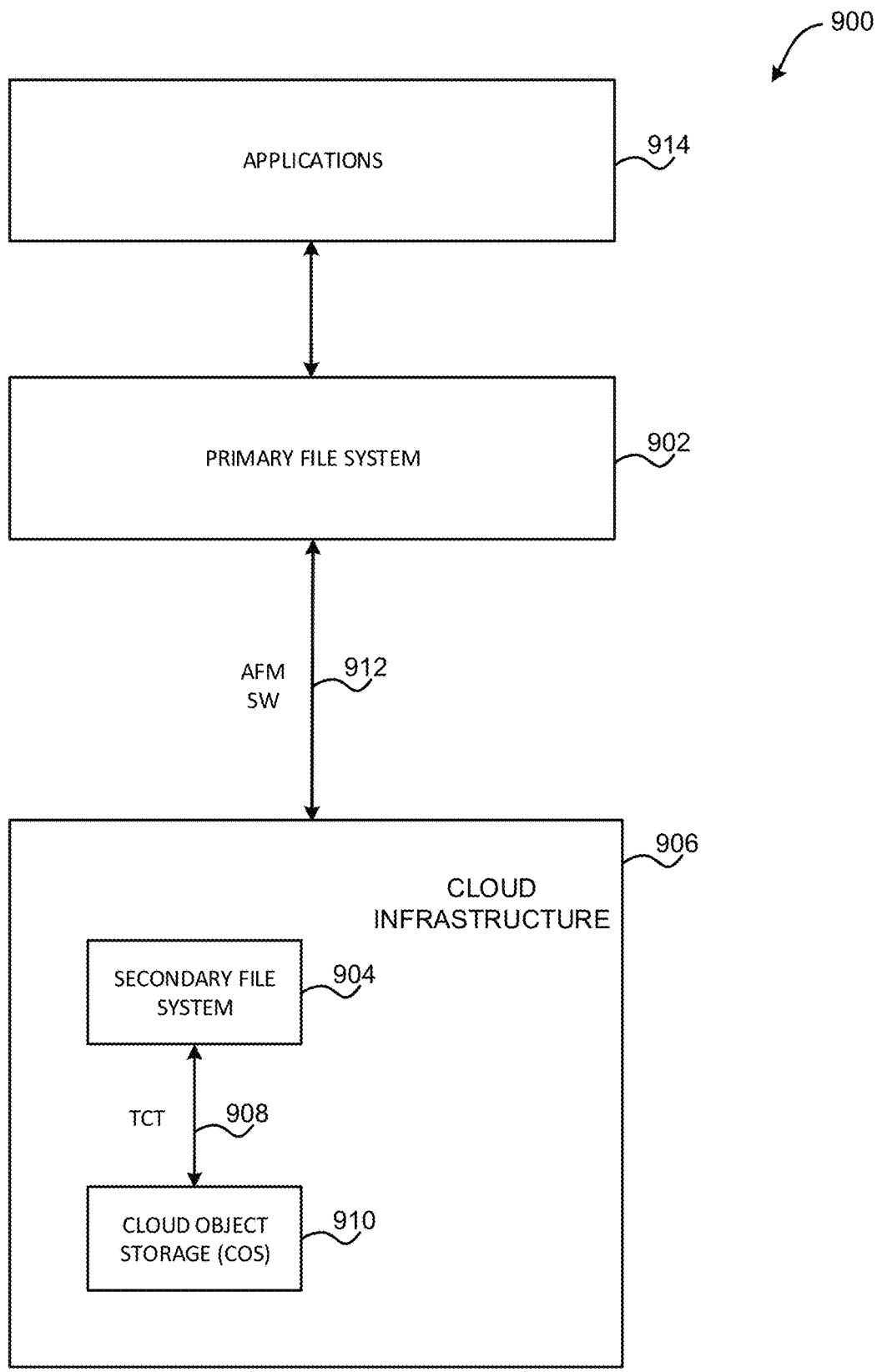
FIG. 9 illustrates an exemplary asynchronous file replication environment, in accordance with one embodiment.

FIG. 9 shows an exemplary asynchronous file replication environment 900, where all the files from a primary file system 902 are continuously replicated to a secondary file system 904 on the cloud infrastructure 906.

In yet another embodiment, in a third step, since all the files are now available on the secondary file system 904 on the cloud infrastructure 906, transparent cloud tiering 908 may be used to migrate the files to a cloud object storage 910.

In another embodiment, a DR Manager may look at the DR_Priority_Index of the files and filesets (e.g., directories, etc.) and may then co-ordinate the migration. A DR_Priority_Index Threshold may optionally set by a user to help aid the migration of the data to the cloud storage. If the value is not set, then a default value may be automatically computed by a policy scan of all the files and directories.

Additionally, in one embodiment, the data may be migrated from the secondary file system 904 that may include a softlayer cloud to a cloud object storage 910 (e.g., a public COS, etc.) using transparent cloud tiering 908. In one embodiment, the network costs associated with this migration may be zero as the internal network of the cloud infrastructure is used and is not charged.

Further, in one embodiment, a scenario may be considered where the file system cluster hosted on the primary file system 902 goes down. Since all the data is replicated to the file system on the cloud object storage 910, the applications may be failed over to the secondary file system 904 on the cloud. When the primary file system 902 comes back, it is possible to move only changed data and meta-data from the secondary file system 904 to the primary file system 902.

RTO may be instant, and applications may be brought up on the cloud infrastructure 906. Also, since the tiering happens using the DR_Priority_Index, all the mission critical data may be stored on the secondary file system 904 (and may not be tiered to the COS 910) and may therefore be instantly available to the applications. For the files with lower DR_Priority_Index, the data may be tiered to the COS 910 and may be accessed via transparent recall.

Further still, in one embodiment, a scenario may be considered where the cloud infrastructure 906 goes down, and since the primary file system 902 is available, applications may continue to work.

In this way, instant failover may be provided during an unavailability of a primary file system 902, while leveraging cloud tiering to save storage costs by moving data to less expensive storage medium. Additionally, intelligent and automated granular classification of data may be performed using DR_Priority_Index to keep the data on the secondary file system 904 instead of tiered to the cloud object storage 910. This may provide high priority and mission critical applications instant access to the data during a failover.

Additionally, all applications accessing the primary file system 902 may be guaranteed to have access to all the data during a failover. The cloud object storage 910 may be used to save costs, but may provide online access to the data via transparent recall. Further, a DR Manager may automatically monitor a DR_Priority_Index and may migrate the data to the cloud object storage 910 automatically without any user invention. A co-resident migration may be used for cases where the data may be present on both the secondary file system 904 and also on cloud object storage 910. Further, a disaster recovery mechanism may intelligently optimize the DR based on multiple factors (e.g., RTO, cost, application impact, etc.).

Further, in one embodiment, the secondary file system 904 may include a small spectrum scale cluster configured as part of the cloud object storage 910. These small spectrum scale clusters may require little disk space to keep meta-data of the primary file system 902 and some hot data (actively used) of the primary file system 902. The cold (e.g., inactively used or old data, etc.) data may be migrated to cloud object storage 910 periodically based on policy. An AFM based singlewriter (SW) relationship 912 may be established between the primary file system 902 and the secondary file system 904 which may be running as part of cloud object storage 910.

In another embodiment, any changes made at the primary file system 902 may be asynchronously replicated to the secondary file system 904. Based on RPO intervals, periodical snapshots may be taken at the primary file system 902 and the secondary file system 904 as well. To consume less space by RPO snapshots at the secondary file system 904, any data available on the secondary file system 904 may be migrated to COS 910 before taking a snapshot. Once the entire data is migrated to COS 910, the corresponding peer snapshot may be taken at the secondary file system 904 with meta-data only.

In one embodiment, a portion of the data at the secondary file system 904 may be periodically migrated to COS 910 based on policy so that only hot data is left on the secondary file system 904. Only that hot data may need to be migrated to COS 910 before taking a snapshot so that the snapshot may contain only meta-data (including the stubs of the migrated files) of the files. Also, the data may be migrated using TCT 908 over a local network since the secondary file system 904 is running as part of the cloud infrastructure 906 itself.

At any time, if the primary file system 902 is hit with a disaster, access to data by the applications 914 may be failed over to the secondary file system 904 running as part of the cloud infrastructure 906. The secondary file system 904 may restore to the most recent snapshot available on the secondary file system 904 before applications 914 are failed over to the secondary file system 904. Since the secondary snapshot may only include meta-data, the restore may be fast. This may reduce the RTO time since a restoration of the secondary file system 904 may contribute to RTO time. A shorter RTO may result in a shorter application downtime.

In another embodiment, a user may also build a new primary file system and may fail over applications to the new primary file system, keeping the secondary file system 904 as a secondary site (e.g., a DR site, etc.).

The following steps may be followed to build a new primary file system and fail over the applications to the new primary file system. First, the secondary file system 904 may be restored to a most recent snapshot for data consistency. The restore may be efficient since the snapshot contains only meta-data. This may improve the RTO since the snapshot restoration time may contribute to the RTO.

Additionally, a new primary file system may be configured, or a standby cluster may be used as new primary file system. Once the new primary file system is selected, a singlewriter relationship may be established between the new primary file system and the secondary file system 904.

The applications may fail over to the new primary file system which may start using the data cached from the secondary file system 904 (DR site) on-demand as required. As applications access data on the new primary file system the data may be fetched from the secondary file system 904 which in turn may get the data from COS 910 using the meta-data (stubs) of the files to serve the applications 914 on the new primary file system.

Further, in one embodiment, while taking peer snapshots at the secondary file system 904 at RPO intervals, the entire data from the secondary file system 904 may be migrated to COS 910 which may update the stubs as part of the meta-data and which may copy the data to new versions of files on a low cost COS 910. Most of the cold data may have been already migrated to COS 910, since as data becomes cold it may get migrated to COS 910 as part of a policy running periodically.

In another embodiment, only the hot data may be present on the secondary file system 904 before taking a snapshot. That hot data too may be migrated before taking snapshots, such that the snapshot contains only meta-data of the files. The primary file system 902 may be acknowledged once during a long running snapshot process so that it may wait to send any new changes to the secondary file system 904 for the file set until the secondary file system 904 takes a snapshot successfully for that file set.

The snapshot with meta-data may provide various advantages. For example, the restore to the most recent snapshot during failover may be fast since only meta-data of the file system may be restored. Additionally, the RTO time may be short since the restore time of the file system contributes to the RTO; therefore, the application downtime may be shorter. Further, the snapshot space consumption may be less since snapshots may have modified blocks of meta-data only.

In another embodiment, a DR Manager running on the secondary file system may run policy periodically and may migrate the cold data to the COS 910 as per policy. Additionally, to improve the RPO snapshot support with meta-data only, the DR Manager may perform the following additional tasks.

Initially, the DR Manager may read a configured RPO value. On a per-file set basis, the DR Manager may wait until a first RPO snapshot request is received from the primary file system 902. On per-file set basis, the DR Manager may calculate an expected next RPO snapshot time Tn, where Tn=current time (RPO request time)+RPO. Then the DR Manager may periodically check whether a current time is getting close to Tn. Once it finds that the current time is close to Tn, it may overwrite the policy to migrate cold data to COS 910 and may try to flush all the data present in the file set to COS 910. This may minimize the data presence in the file set when a snapshot is to be taken so that there may be little or no data present in the file set whenever it is time to take the next snapshot.

Additionally, the DR Manager may migrate the older data of hot data files first before the new data of the hot data files, while migrating the data in advance beforehand to take the next RPO snapshot. This may reduce the chances of a file getting modified immediately after migrating the same to COS 910.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, at a virtual file system within a cloud computing environment, replicated data from a physical file system separate from the cloud computing environment, wherein the replicated data includes a replica of data stored at the physical file system;
transferring the replicated data from the virtual file system to cloud storage within the cloud computing environment in response to determining that a priority index score for the replicated data exceeds a predetermined threshold; and
providing access to the replicated data in response to a failure of the physical file system, utilizing the virtual file system and the cloud storage, including:
receiving, at the virtual file system, a redirected request for the replicated data, wherein the request is redirected to the virtual file system in response to a failure of the physical file system to service a request for data from the physical file system, and
performing, by the virtual file system in response to receiving the redirected request for the replicated data, a recall operation at the virtual file system utilizing a stub located at the virtual file system, wherein the stub is used to identify a location of the replicated data within the cloud storage.

2. The computer-implemented method of claim 1, wherein data located at the physical file system is replicated to create the replicated data, and the replicated data is sent asynchronously from the physical file system to the virtual file system as part of an active file management (AFM) operation.

3. The computer-implemented method of claim 1, comprising removing the replicated data from the virtual file system after transferring the replicated data to the cloud storage.

4. The computer-implemented method of claim 1, wherein the replicated data is maintained within the virtual file system after transferring the replicated data to the cloud storage.

5. The computer-implemented method of claim 1, wherein the replicated data is transferred from the virtual file system to the cloud storage utilizing transparent cloud tiering (TCT).

6. The computer-implemented method of claim 1, comprising:
determining that the virtual file system is available after a corruption of data within the virtual file system;

determining that data has changed within the physical file system since a last successful synchronization between the virtual file system and the physical file system; and replicating the data that has changed from the physical file system to the virtual file system.

7. The computer-implemented method of claim 1, comprising:

creating, at the virtual file system, the stub, wherein the stub includes an inode identifying the location of the replicated data within the cloud storage.

8. The computer-implemented method of claim 1, wherein the request for data from the physical file system is made by an application running within a user system.

9. The computer-implemented method of claim 1, wherein the cloud storage returns the replicated data directly to a user system requesting the replicated data from the virtual file system.

10. The computer-implemented method of claim 1, wherein in response to determining that the physical file system is again available, data is sent from the virtual file system and cloud storage to the physical file system, the data including data and metadata that have changed during the failure of the physical file system.

11. The computer-implemented method of claim 1, comprising:

creating the stub at the virtual file system when the replicated data is transferred from the virtual file system to the cloud storage, wherein the stub includes an inode that identifies a storage location of the replicated data within the cloud storage;

removing the replicated data from the virtual file system after transferring the replicated data to the cloud storage;

determining that the physical file system is again available;

sending data and metadata that have changed during the failure of the physical file system from the virtual file system and cloud storage to the physical file system;

determining that the virtual file system is available after a corruption of data within the virtual file system;

determining that data has changed within the physical file system since a last successful synchronization between the virtual file system and the physical file system; and replicating the data that has changed from the physical file system to the virtual file system.

12. The computer-implemented method of claim 1, wherein the priority index score is calculated and added to the replicated data as metadata prior to the replicated data being received at the virtual file system within the cloud computing environment.

13. The computer-implemented method of claim 1, wherein the priority index score is calculated based on a combination of a heat score and a weight score, wherein the heat score includes a value calculated based on an amount of time since the data was accessed, wherein the weight score is calculated based on a type of applications that access the data, wherein the calculated weight score is relatively higher in response to the data being accessed by one or more applications predetermined to have a high importance, wherein the calculated weight score is relatively lower in response to the data being accessed by one or more applications predetermined to have a low importance.

14. A computer program product comprising one or more computer readable storage media, and program instructions collectively stored on the one or more computer readable storage media, the program instructions comprising instructions configured to cause one or more processors to perform a method comprising:

receiving, at a virtual file system within a cloud computing environment, replicated data from a physical file system separate from the cloud computing environment, utilizing the one or more processors, wherein the replicated data includes a replica of data stored at the physical file system;

transferring, utilizing the one or more processors, the replicated data from the virtual file system to cloud storage within the cloud computing environment in response to determining that a priority index score for the replicated data exceeds a predetermined threshold; and providing, utilizing the one or more processors, access to the replicated data in response to a failure of the physical file system, utilizing the virtual file system and the cloud storage, including:

receiving, at the virtual file system utilizing the one or more processors, a redirected request for the replicated data, wherein the request is redirected to the virtual file system in response to a failure of the physical file system to service a request for data from the physical file system, and performing, by the virtual file system utilizing the one or more processors in response to receiving the redirected request for the replicated data, a recall operation at the virtual file system utilizing a stub located at the virtual file system, wherein the stub is used to identify a location of the replicated data within the cloud storage.

15. The computer program product of claim 14, wherein the priority index score is calculated based on a combination of a heat score and a weight score, wherein the heat score includes a value calculated based on an amount of time since the data was accessed, wherein the weight score is calculated based on a type of applications that access the data, wherein the calculated weight score is relatively higher in response to the data being accessed by one or more applications predetermined to have a high importance, wherein the calculated weight score is relatively lower in response to the data being accessed by one or more applications predetermined to have a low importance.

16. The computer program product of claim 14, wherein the priority index score is calculated and added to the replicated data as metadata prior to the replicated data being received at the virtual file system within the cloud computing environment.

17. A system, comprising:

a processor; and logic integrated with the processor, executable by the processor, or integrated with and executable by the processor, the logic being configured to:

receive, at a virtual file system within a cloud computing environment, replicated data from a physical file system separate from the cloud computing environment, wherein the replicated data includes a replica of data stored at the physical file system;

transfer the replicated data from the virtual file system to cloud storage within the cloud computing environment in response to determining that a priority index score for the replicated data exceeds a predetermined threshold; and provide access to the replicated data in response to a failure of the physical file system, utilizing the virtual file system and the cloud storage, including:

receiving, at the virtual file system, a redirected request for the replicated data sent in response to the failure of the physical file system to service a request for data from the physical file system, and performing, by the virtual file system in response to receiving the redirected request for the replicated data, a recall operation at the virtual file system utilizing a stub located at the virtual file system, wherein the stub is used to identify a location of the replicated data within the cloud storage.

18. The system of claim 17, wherein data located at the physical file system is replicated to create the replicated data, and the replicated data is sent asynchronously from the physical file system to the virtual file system as part of an active file management (AFM) operation.

19. The system of claim 17, wherein the priority index score is calculated based on a combination of a heat score and a weight score, wherein the heat score includes a value calculated based on an amount of time since the data was accessed, wherein the weight score is calculated based on a type of applications that access the data, wherein the calculated weight score is relatively higher in response to the data being accessed by one or more applications predetermined to have a high importance, wherein the calculated weight score is relatively lower in response to the data being accessed by one or more applications predetermined to have a low importance.

20. The system of claim 17, wherein in response to determining that the physical file system is again available, data is sent from the virtual file system and cloud storage to the physical file system, the data including data and metadata that have changed during the failure of the physical file system.

\* \* \* \* \*